United States Patent Office 3,391,004
Patented July 2, 1968

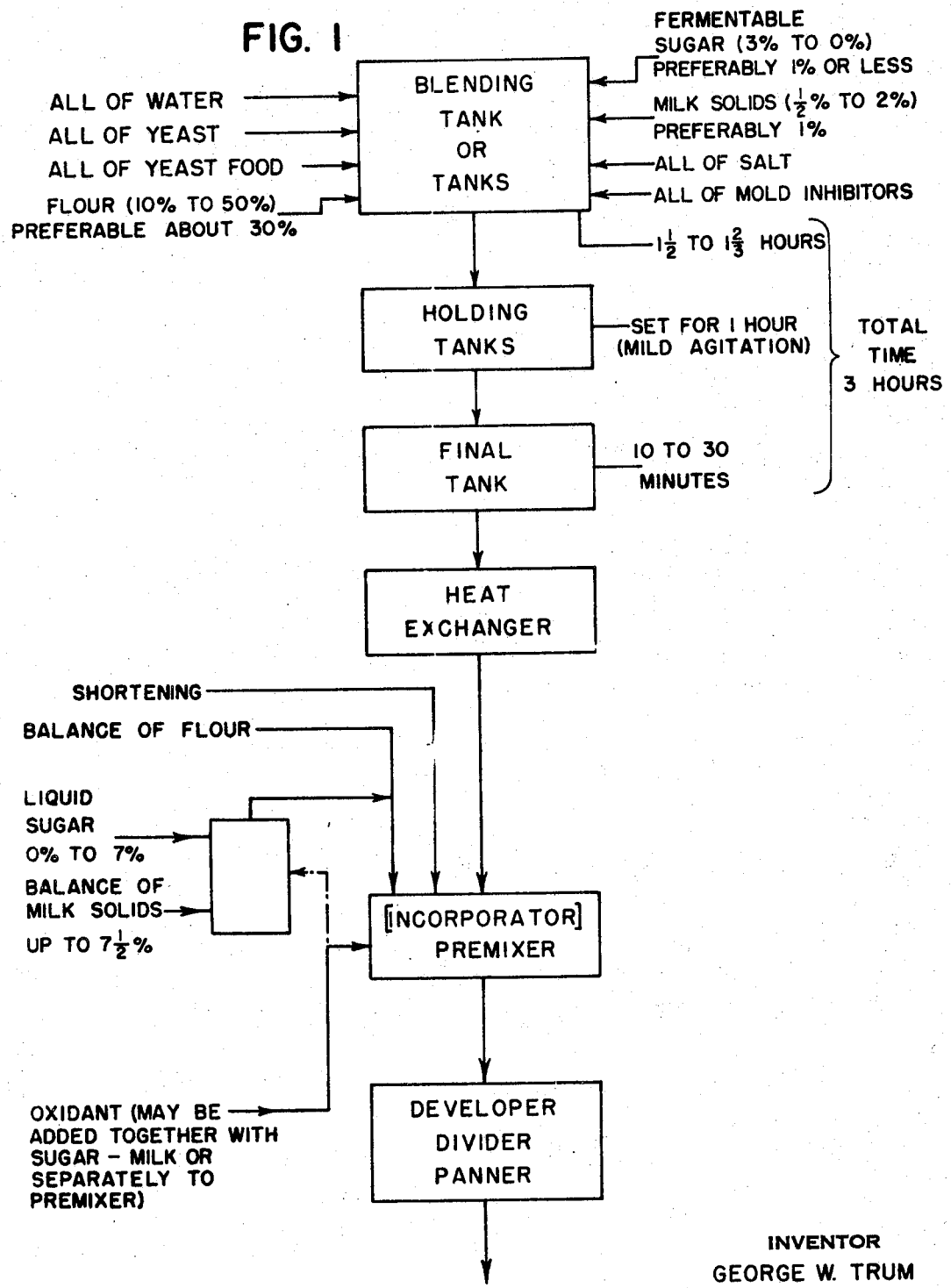

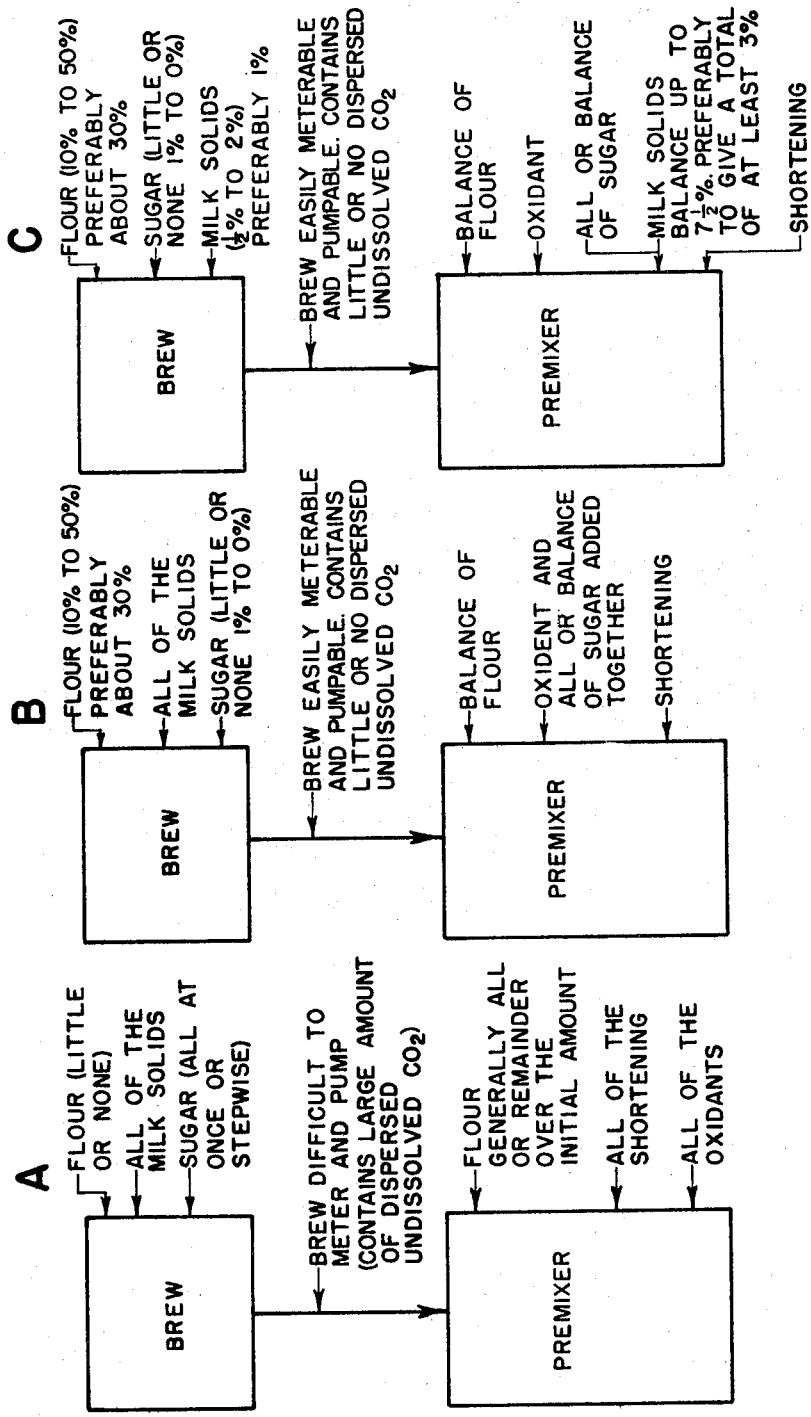

3,391,004
PRE-FERMENT PROCESS FOR MAKING DOUGH HAVING HIGH MILK SOLIDS CONTENT
George W. Trum, Richmond, Va., assignor to American Machine & Foundry Company, a corporation of New Jersey
Continuation of application Ser. No. 222,903, Sept. 11, 1962. This application Oct. 31, 1966, Ser. No. 591,026
18 Claims. (Cl. 99—90)

ABSTRACT OF THE DISCLOSURE

A process of preparing bread dough by the pre-ferment process, comprising the steps of:

preparing a pre-ferment containing less than 2 percent (bakers' percentage) of milk solids, and
adding milk solids to the dough mixture admixed with a liquid vehicle which produces sufficient osmotic pressure to substantially inhibit release of the serum protein in the milk solids into solution, the milk solids being in an amount such as to give a total milk solid content in the bread of from 4 to 8 percent (bakers' percentage).

---

This application is a continuation of application Serial No. 22,903, filed Sept. 11, 1962, now abandoned.

This invention relates to the production of bread dough containing a relatively high milk content.

More particularly, the invention relates to processes in the manufacture of bread dough employing liquid pre-ferments.

While the invention may be used in a batch process, it is particularly adaptable to known continuous processes and process equipment.

It is an object of the invention to produce a quality bread dough with a high milk content in a pre-ferment process. It is a particular object to produce such a bread dough in a continuous dough process.

Another object of the invention is to make a bread dough by the pre-ferment method, in which a high percentage of milk may be used in a dough made from standard, that is non-premium flour, without involving the characteristic penalties in loaf volume, crumb structure and coarseness and other deficiencies.

The production, by the pre-ferment process, of high milk content bread of good quality from ordinary wheat flour has been a long sought objective in the baking industry. Because of its nutritional value, such bread is much desired, but has undesirable characteristics when made from standard flours in the pre-ferment method.

Generally, when milk solids exceeding a level of about 4% are used in the continuous making of dough from wheat flour, the resultant bread has an undesirable low volume, coarse crumb and large irregular holes. The present invention makes it possible to obtain the desirable nutritional values and other advantages inherent in the use of a high percentage of milk solids in the manufacture of wheat bread by the continuous pre-ferment process, while producing loaves having desired characteristics.

It is possible by special means to produce wheat bread, by the continuous pre-ferment process, containing milk solids as high as 6%. Attaining good bread at these levels requires use of special relatively expensive flours, or special low serum protein milk solids, or improvers. Even then the load deficiencies are overcome to only a limited extent. By means of the present invention, it is possible in a pre-ferment process (batch or continuous) to increase the content of milk solids to 8%, or more, without the use of premium flours or other special ingredients. Further, this is achieved solely through a process change involving only the order of known procedural steps.

An object of the present invention is the production of bread loaves, by the pre-ferment process, batch or continuous, through a change in the order of procedural steps to achieve a high milk content while retaining the physical load characteristics acceptable to the trade.

Milk solids contain a protein, called "serum protein" which has an adverse effect on bread. It, accordingly, is an object of the invention to inhibit or eliminate this effect. While I do not understand the mechanism by which this invention eliminates the adverse effects of the serum protein, I believe that my novel method of introducing the milk solids prevents their being in solution in the dough. I have found that by suspending the milk solids (except for a small percentage used in the pre-ferment for its buffering action) in a relatively concentrated sugar solution, the adverse effects of the serum protein are eliminated. It would appear that the high osmotic pressure of the syrup prevents full hydration of the milk particles and thus the serum protein from dissolving. Accordingly, on theory, it is my invention to add the milk solids in a liquid vehicle in which the serum protein does not dissolve.

As used herein, all percentages are bakers' percentage, i.e., based upon the total formula flour.

This invention, which permits the use of up to 8% of milk solids in bread made by the pre-ferment method, batch or continuous (particularly continuous dough production) inheres essentially in a process modification. Currently, in some continuous dough making all milk solids are added to the pre-ferment, generally called brew. By contrast, in the present invention, there is employed in the pre-ferment only sufficient milk solids to control the pH at the desired level. This is a relatively small amount on the order of up to 2% (bakers' percentage). The balance, that is the greater part, of the milk solids are combined with the other ingredients at a later stage in the continuous dough making process, that is in the pre-mixing or incorporation stage. It has been found advantageous to suspend these milk solids in a sugar solution, or syrup, which is introduced in the premixer, together with flour, shortening, oxidant and pre-ferment to form the dough. Adding the milk solids to the sugar solution at this point has the further advantage of reducing in a continuous process the number of metering feeders.

If desired, and as has been described in my copending application, Ser. No. 125,702, now abandoned oxidants may be added to the sugar syrup, which is introduced at the premixing, or incorporation stage in the process. This is true also when, as described herein, milk solids are used in the sugar syrup.

The invention may be understood from the following description of a preferred embodiment in which it is presently practiced, when read together with the associated drawings. Currently, the greatest advantage appears in employing this invention in continuously processed dough. It should be understood, however, that the invention need not be so limited. It has obvious utility in any pre-ferment dough process.

In the drawings:
FIG. 1 is a flow sheet for the continuous production by the pre-ferment method, according to the invention, of bread dough having a high percentage of milk solids; and
FIG. 2 is a flow sheet contrasting the important aspects of bread dough making by the pre-ferment method in accordance with the present invention and in accordance with two other known methods.

Referring to FIG. 1, there is shown a process particularly designed for continuous production of bread dough which will permit the incorporation in the dough of considerably more milk solids than has been possible heretofore, while producing bread dough for loaves which are acceptable as to flavor, volume, fineness of crumb, uniformity and smallness in size of holes, and other desirable characteristics.

As FIG. 1 indicates, the fermentation system includes a blending tank, or tanks, into which are mixed substantially all of the formula requirements of water, yeast and yeast food. An amount of formula flour ranging from 10% to 50% is added. In practice, as much as 50% of the total flour has been used with satisfactory results. However, in one continuous commercial pre-ferment operation, about one-third of the total flour has been found most practicable at present. While the use of flour in a range below 20% is permissible, the 20% to 50% range is preferable.

A quantity of fermentable sugar ranging from 3% to 0%, preferably 1% or less, milk solids ranging from ½% to 2%, preferably 1%, all of the salt and all of the mold inhibitors are also combined with the other ingredients in the blending tank, or tanks, and the mixture remains therein, at a temperature suitable to permit reactivity, preferably in the range from 80 degrees to 86 degrees Fahrenheit for an interval, preferably of about 80 to 100 minutes. Since such fermentation produces heat, cooling is frequently necessary to maintain the preferred temperature, as is well known.

As indicated in FIG. 1, the mixture may next be transferred to holding tanks, where it is subjected to mild agitation, preferably for about 60 minutes and then to a final tank preferably for from 10 to 30 minutes to complete fermentation. Then the mixture is passed through a heat exchanger to reduce its temperature as necessary to control the final temperature of the developed dough, as is well known in the art. This mixture with the balance of the flour, all of the shortening, liquid sugar from 0% to 7%, the balance of the milk solids, that is 6% to 7½%, and all of the oxidants are combined in the premixer.

As indicated in FIG. 1, the sugar syrup and milk solids are combined before being added at the premixer. The oxidant solution is shown being added individually. However, alternatively it may be combined with the milk and sugar syrup and inserted with them in the premixer. After premixing in the premixer, the pre-mixed dough passes into the developer, divider and panner.

It is pointed out that in the continuous process of dough making, the length of time spent in the premixer, developer, and panner is very short requiring only about 1 to 3 minutes, depending upon the work rate and throughput rate at which the process equipment is set. The total time required from the first blending step until the dough is ready for pan proofing is generally slightly more than about three hours. It is also pointed out that to employ the premixer, developer, divider and panner efficiently in continuous operation, several sets of holding tanks are generally required.

By following the method described in the foregoing, that is by limiting the quantity of milk solids introduced into the blending tank, or tanks, in the pre-fermenting, to the small quantity required to control the pH, it is possible at the later incorporating stage to add a balance of milk solids to make a total of 8% or more milk solids to obtain the nutritional and other advantages inherent therein without adversely affecting other desirable physical and organoleptic characteristics of the loaf.

FIG. 2 is a flow sheet, affording a convenient graphic comparison of the essential differences between three pre-ferment processes under three captions A, B and C, respectively. Under A is shown a well-known process employed in the continuous production of bread dough.

Under B is shown a recent improvement employing low fermentable sugar in the brew with the subsequent addition of sugar to the premix. The invention is particularly adaptable to this process.

Under C is shown a process embodying the present invention which utilizes the process of B in that it includes the addition of fermentable sugar to the premix.

Under A in FIG. 2, it is indicated that little or no flour is mixed in the brew. Under both B and C, from 10% to 50% of the fluor, preferably about 30% is mixed in the brew. In both A and B, all of the milk solids are mixed in the brew, while in C a small part of the total of 8%, namely ½% to 2%, preferably 1%, is mixed in the brew. Under A, all of the sugar is introduced into the brew at once. In both B and C, little or no sugar, from 1% to 0% is introduced into the brew.

It should be understood that the invention may be applied to the process of A, since the presence or absence of flour in the brew is immaterial to the invention. It would appear, however, that dissolved sugar must be added with the milk solids in order to achieve the aforedescribed high osmotic pressure. Sugar appears to be the most convenient formula ingredient for producing the desired osmotic pressure to prevent release of serum protein into solution. Presumably, any agent, not otherwise harmful, which would prevent the dissolving of the serum protein may substitute for sugars. Also, it should be noted, that a large portion of sugar added at the pre-mixing stage is never fermented, but serves merely as the source of bread sweetener. Accordingly, a large percentage of material added at this stage need not be a fermentable or even a metabolizable sugar. Any sweetening agent would do. For example, a sweetener indicated for use by diabetics would do.

The process indicated under C, except for the differences with respect to the quantities and time and place of the addition of the milk solids, is the same as under B and, therefore, has the advantages of the B process which include greater ease in metering and pumping. As has been frequently mentioned, only a small quantity of milk solids, ½% to 2%, preferably 1% is mixed in the brew and the balance, to provide a total of 8%, or more, is mixed in the pre-mixer. Thus the C process is fully controllable, to insure uniform and desirable chemical, physical and organoleptic properties in the resultant bread and it fills the long sought bread manufacturer's need for a bread made from a dough produced by the continuous pre-ferment process from standard materials.

Following are examples of three different formulas having lean, average and rich formula amounts of milk solids. The quantities shown in the tabulations are, as heretofore stated, bakers' percentage. Since a total of 100 pounds of flour is specified in each example, the quantities of each of the other ingredients correspond to pounds except in the quantity of the oxidants which is expressed in parts per million, based on flour.

Example I.—Lean formula

Liquid pre-ferment:

| Ingredient | Amount |
|---|---|
| Water | 60.0 |
| Yeast | 3.0 |
| Yeast food | 0.5–0.75 |
| Flour | 20.0 |
| Fermentable sugar | 2.0 |
| Non-fat milk solids | 0.5 |
| Salt | 2.5 |
| Inhibitors | 0.1–0.3 |

This mix was fermented about three hours and was then premixed with the below listed ingredients. The premix was then developed, divided, panned, pan proofed and baked.

| Ingredient | Amount |
|---|---|
| Water (employed as vehicle for the sugar, milk solids and oxidant) | 6.0 |
| Flour | 80.0 |
| Fermentable sugar | 6.0 |
| Non-fat milk solids | 2.5 |
| Shortening | 3.0 |
| Oxidant | p.p.m.  40–75 |

Example II.—Average formula

Liquid pre-ferment:
```
Water ------------------------------------ 57.0
Yeast ------------------------------------  3.0
Yeast food -------------------------------  0.5
Flour ------------------------------------ 30.0
Sugar ------------------------------------  0.5
Dry milk solids --------------------------  1.0
Salt -------------------------------------  2.0
Inhibitors -------------------------------  0.15
```

This mix was fermented about three hours and was then premixed with the below listed ingredients. The premix was then developed, divided, panned, pan proofed and baked.

```
Water ------------------------------------  8.0
Flour ------------------------------------ 70.0
Sugar ------------------------------------  5.5
Dry milk solids --------------------------  5.0
```

Example III.—Rich formula

Liquid pre-ferment:
```
Water ------------------------------------ 56.0
Yeast ------------------------------------  3.0
Yeast food -------------------------------  0.5
Flour ------------------------------------ 40.0
Fermentable sugar ------------------------  1.0
Dry milk solids --------------------------  2.0
Salt -------------------------------------  2.0
Inhibitors -------------------------------  0.1
```

This mix was fermented about three hours and was then premixed with the below listed ingredients. The premix was then developed, divided, panned, pan proofed and baked.

```
Water ------------------------------------ 10.0
Flour ------------------------------------ 60.0
Fermentable sugar ------------------------  6.0
Dry milk solids -------------------------- 5.0-6.0
Shortening -------------------------------  4.0
Oxidant ------------------------------p.p.m. 40-75
```

What is claimed is:

1. In a process of preparing bread by the pre-ferment method wherein the sugar is limited to a maximum of 3 percent in the pre-ferment and the pre-ferment contains 10 to 50 percent of flour, both based on the total weight of flour used to prepare the final bread, the improvement comprising:
    (a) Using ½ to 2 percent (bakers' percentage) of milk solids in pre-ferment preparation, and
    (b) Adding to the dough mixture milk solids being in an amount such as to give a total milk solids content in the dough of 5 to 8 percent (bakers' percentages) and sugar in an amount to give 4 percent of sugar in the loaf after baking, said milk solids being admixed with said sugar prior to addition to said dough mixture.

2. The process of claim 1 wherein the sugar is selected from the group comprising the soluble monosaccharides and disaccharides.

3. The process of claim 1 in which the flour is non-premium.

4. The process of claim 2 in which the milk solids contain normal quantities of serum protein.

5. In a process of preparing bread by the pre-ferment method wherein the sugar is limited to a maximum of 1 percent in the pre-ferment and the pre-ferment contains 10 to 30 percent of flour, both based on the total weight of flour used to prepare the final bread, the improvement comprising:
    (a) Using ½ to less than 1 percent (bakers' percentage) of milk solids and ½ percent to less than 1 percent (bakers' percentage) of fermentable sugar, in pre-ferment preparation, and
    (b) Adding milk solids admixed with sugar syrup to the dough mixture, the milk solids being in an amount such as to give a total milk solids content in the dough of 4 to 8 percent (bakers' percentage) and the sugar being in an amount such as to give a total sugar content in the loaf of 2 to 4 percent after baking.

6. In a process of preparing bread by the pre-ferment method wherein the sugar is limited to a maximum of 2 percent in the pre-ferment and the pre-ferment contains 20 to 40 percent of flour, both based on the total weight of flour used to prepare the final bread, the improvement comprising:
    (a) Using 0 to less than 1 percent (bakers' percentage) of milk solids and 0 to 2 percent of fermentable sugar, in pre-ferment preparation, and
    (b) Adding milk solids admixed with sugar syrup to the dough mixture, the milk solids being in an amount such as to give a total milk solids content in the dough of 6 to 8 percent (bakers' percentage) and sugar of between 2 and 4 percent in the loaf after the baking.

7. A process of preparing bread dough by the pre-ferment process, comprising the steps of:
    preparing a pre-ferment containing less than 2 percent (bakers' percentage) of milk solids, and
    adding milk solids to the dough mixture admixed with a liquid vehicle which produces sufficient osmotic pressure to prevent release of the serum protein in the milk solids into solution, the milk solids being in an amount such as to give a total milk solid content in the bread of from 4 to 8 percent (bakers' percentage).

8. The process of claim 7, wherein:
    said liquid vehicle contains a dissolved crystalline carbohyrate.

9. The process of claim 7, wherein:
    said liquid vehicle is a sugar syrup.

10. The process of claim 9, wherein:
    the sugar in the sugar syrup is selected from the group comprising the soluble monosaccharides and disaccharides.

11. In a process of preparing bread by the pre-ferment method wherein the sugar is limited to a maximum of 2 percent in the pre-ferment and the pre-ferment contains 10 to 50 percent of flour, both based on the total weight of flour used to prepare the final bread, the improvement comprising:
    (a) Using less than 2 percent (bakers' percentage) of milk solids in pre-ferment preparation, and
    (b) Adding milk solids admixed with a sweetener in a liquid medium to the dough mixture, said sweetener in the liquid medium being operable to produce sufficient osmotic pressure therein to prevent release of the serum protein in the milk solids into solution, the milk solids being in an amount such as to give a total milk solids content in the dough of 4 to 8 percent (bakers' percentage) and sweetener in an amount equivalent in sweetening effect to 2 to 4 percent of sugar in the loaf after baking.

12. The process of claim 11 wherein the sweetener is a sugar selected from the group comprising the soluble monosaccharides and disaccharides.

13. A process of preparing bread dough by the pre-ferment process, comprising the steps of:
    preparing a pre-ferment containing less than 2 percent (bakers' percentage) of milk solids, and
    adding milk solids to the dough mixture admixed with a liquid vehicle which produces sufficient osmotic pressure to substantially inhibit release of the serum protein in the milk solids into solution, the milk solids being in an amount such as to give a total milk solid content in the bread of from 4 to 8 percent (bakers' percentage).

14. The process of claim 13, wherein:
   said liquid vehicle contains a dissolved crystalline carbohydrate.
15. The process of claim 13, wherein:
   said liquid vehicle is a sugar syrup.
16. The process of claim 15, wherein:
   the sugar in the sugar syrup is selected from the group comprising the soluble monoaccharides and disaccharides.
17. In a process of preparing bread by the pre-ferment method wherein the sugar is limited to a maximum of 2 percent in the pre-ferment and the pre-ferment contains 10 to 50 percent of flour, both based on the total weight of flour used to prepare the final bread, the improvement comprising:
   (a) Using less than 2 percent (bakers' percentage) of milk solids in pre-ferment preparation, and
   (b) Adding milk solids admixed with a sweetener in a liquid medium to the dough mixture, said sweetener in the liquid medium being operable to produce sufficient osmotic pressure therein to substantially inhibit release of the serum protein in the milk solids into solution, the milk solids being in an amount such as to give a total milk content in the dough of 4 to 8 percent (bakers' percentage) and sweetener in an amount equivalent in sweetening effect to 2 to 4 per- monosaccharides and disaccharides.
18. The process of claim 17, wherein the sweetener is a sugar selected from the group comprising the soluble monosaccharides and disaccharides.

References Cited

FOREIGN PATENTS 741,562  12/1955  Great Britain.

LIONEL M. SHAPIRO, *Primary Examiner.*